Fig. 2
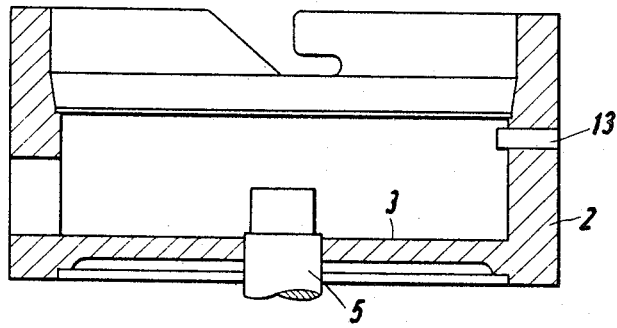
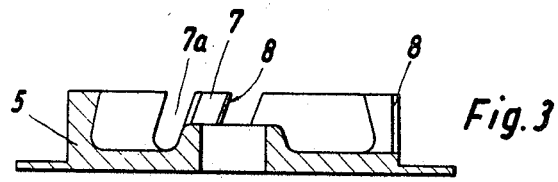
Fig. 3
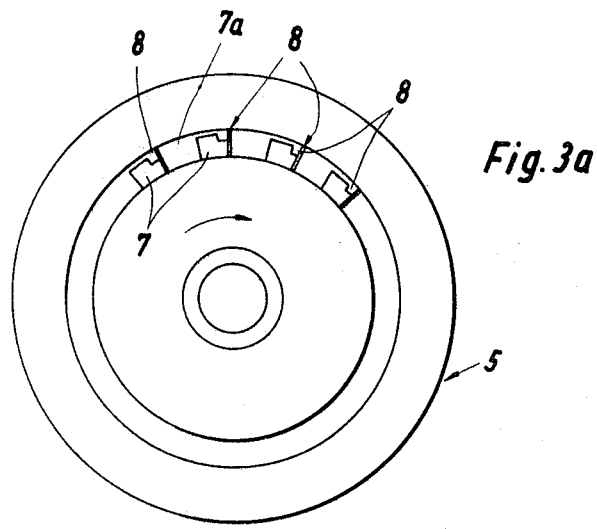
Fig. 3a

United States Patent Office 3,429,350
Patented Feb. 25, 1969

3,429,350
COMMINUTING DEVICE
Fritz Otto, Hameln an der Weser, Germany, assignor, by mesne assignments, to Belder Trust, Vaduz, Liechtenstein
Filed June 14, 1966, Ser. No. 557,403
Claims priority, application Germany, June 16, 1965, St 18,788
U.S. Cl. 146—192                                    9 Claims
Int. Cl. B02c 18/18, 18/36

ABSTRACT OF THE DISCLOSURE

A comminuting device includes a receptacle having a transverse wall and a peripheral wall which extends from one side of the transverse wall and is provided with an outlet in the region of the same. A drive shaft extends through the transverse wall. Cutter means is arranged within the receptacle adjacent to the transverse wall and includes a pair of cutter members having concentric annuli of teeth. At least the innermost cutter member is secured to the drive shaft for rotation therewith so that material entrained is given a rotary component of movement and passes between the teeth of the annuli in radial outward direction to the outlet. Cutter blade means is adhesively bonded to and supported against movement in the predetermined direction by the teeth of at least one annulus in such a manner that pressure of the material against the teeth of this annulus tends to press the cutter blade means into firmer engagement with the associated teeth.

---

The present invention relates to a comminuting device. More specifically, the invention relates to improvements in a machine for finely comminuting raw or cooked meat and similar foodstuffs. Still more specifically, the invention relates to improvements in comminuting machines of the class disclosed, for example, in the copending application Ser. No. 489,658 of Fritz Otto, filed Sept. 23, 1965 now Patent No. 3,335,773.

In prior-art comminuting or grinding machines for foodstuffs and similar materials it is known to locate a rotary cutting member within a stationary cutting member, which latter is provided with an annulus of teeth between which the comminuted material must pass as it leaves the comminuting machine. Such teeth are provided by axially incising an annular wall of the stationary cutting member so as to create slots therein which pass through the entire thickness of the wall. Suitable face portions of the resulting teeth are then sharpened so as to constitute cutting edges which serve to further comminute the material as it is forced to pass over such edges and between the respective teeth. The rotary cutting member may, of course, be similarly constructed.

Machines utilizing such a cutting arrangement are very effective. However, they do have the disadvantage that the cutting edges provided on the respective teeth, particularly those of the stationary cutting member, are blunted relatively quickly and must then be re-sharpened. The configuration of the cutting members per se, and of the teeth in particular, makes it impossible to grind only those relatively small surface portions of the teeth which actually act as cutting edges and it is therefore necessary to grind substantially an entire face of each tooth when the cutting edges must be re-sharpened. The result of this is that the wall-thickness of each tooth is soon reduced below minimum strength, and since the teeth cannot be exchanged the cutting member must be replaced in toto. This problem is aggravated further by the fact that in machines of the type in question only non-rusting materials can be used to construct the cutting members, and that such materials are incapable of retaining sharp cutting edges for any significant period of time, thus further increasing the number of occasions on which the cutting edges must be re-sharpened.

It is therefore an important object of the present invention to overcome the above-described shortcomings of the prior art.

A more specific object of the invention is to provide a comminuting machine of the general type set forth above, which is provided with a cutter arrangement having cutting edges which can be utilized for a significantly longer period of time than known heretofore.

A concomitant object of the invention is to provide a comminuting machine such as outlined above in which the cutting edges of the cutter assembly are replaceable so as to be readily accessible for sharpening and/or for substitution purposes.

A further object of the invention is to provide a machine of the type outlined above in which the cutter blades can be assembled to the respective teeth of their associated cutting members in an extremely simple and inexpensive manner, and in which they can be removed with similar ease.

Briefly stated, one feature of my invention resides in the provision of a machine for comminuting raw or cooked meat and similar materials. The machine comprises a receptacle having a transverse wall and a peripheral wall extending from one side of the transverse wall. The peripheral wall is provided with an outlet located in the region of the transverse wall. A drive shaft forming part of the machine extends through the transverse wall and cutter means is arranged within the receptacle adjacent to the transverse wall. This cutter means includes, in accordance with the invention, a pair of cutter members having concentric annuli of teeth. At least the innermost one of these cutter members is secured to the drive shaft and is adapted to be rotated therewith so that material entrained by the innermost cutter member passes between the teeth of the annuli and to the outlet in the peripheral wall in response to rotation of the drive shaft. Further in accordance with the invention I provide cutter blade means which is adhesively bonded to and supported by the teeth of at least one annulus in such a manner that passage of the material between the teeth of the one annulus tends to press the respective cutter blade means into firmer engagement with the respective teeth.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a side-elevational sectioned view through the lower portion of the receptacle;

FIG. 3 is a side-elevational sectioned view through a rotary cutting member in accordance with the present invention;

FIG. 3a is a top-plan view of the member shown in FIG. 3;

Figure 1:
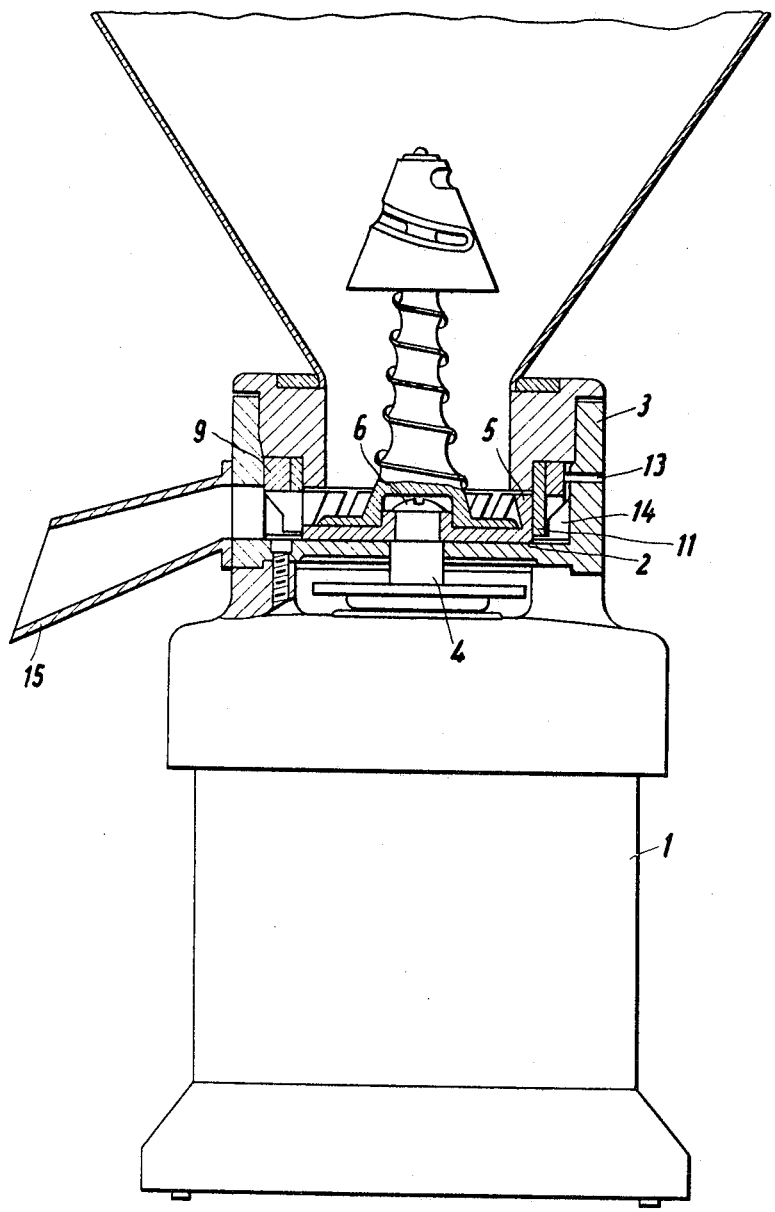
FIG. 1 is an axial section through the receptacle and the cutting members of a comminuting machine which embodies the present invention.

Referring now to the drawing in detail, and firstly to FIG. 1 thereof, it will be seen that there is shown a comminuating machine which comprises a motor 1 carrying a receptacle including a transverse wall 2 which constitutes the bottom wall of the receptacle and a peripheral wall 3 extending upwardly from the upper side of this transverse wall 2. The transverse wall 2 is traversed by a coaxial vertical drive shaft 4 which is connected in a manner not shown, but well known, with the motor 1 and extends with its upper end into the interior of the receptacle where it is non-rotatably secured by means of a screw 6 to a rotary cutting member 5 having an upwardly extending annulus of teeth 7 which are defined by respective slots 7a. The wall thickness of the teeth 7 decreases in direction downwardly from their upper free ends and the slots 7a extend parallel with one another and at an angle to the axis of the cutting member 5. It is to be noted that the wall thickness of the teeth is relatively great.

Figure 4A:
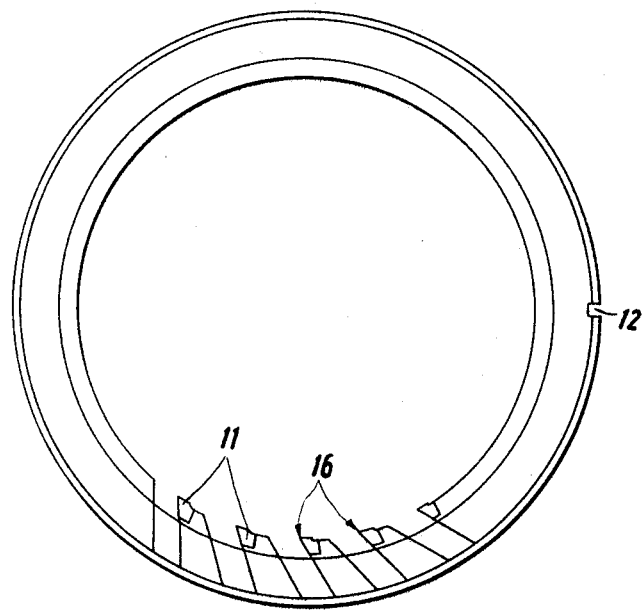
FIG. 4a is a top-plan view of the member shown in FIG. 4.
Figure 4:
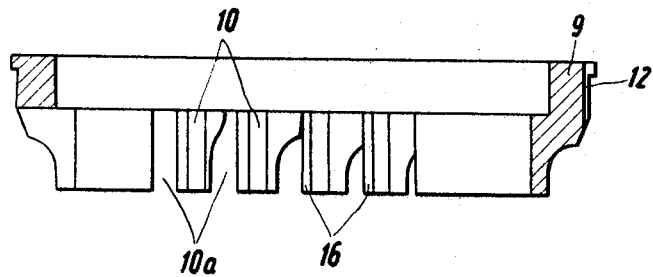
FIG. 4 is a view similar to that shown in FIG. 3, but of a stationary cutting member.

There is further provided a second cutting member 9 which is non-rotatable. As best seen in FIGS. 4 and 4a of the drawing, the peripheral wall of this cutting member 9 also is provided with a plurality of slots which are designated with reference numeral 10a and which define a plurality of teeth 10. The slots 10a extend parallel to one another and are inclined with respect to the axis of the cutting member 9. This stationary cutting member 9 is so inserted into the receptacle that the free edges of its teeth extend in downward direction toward the transverse wall 2 and are outwardly adjacent to the annulus of teeth 7 of the rotary cutting member 5. It will be noticed from FIG. 1 that there is a slight spacing between the two annuli of teeth, and that there similarly is a gap between the annulus of teeth 10 of the stationary cutting member and the peripheral wall 3 of the receptacle. This gap is designated with reference numeral 14 and is, of course, of annular configuration. An outlet 15 is provided in the peripheral wall 3 in such a manner that it communicates with the annular gap 14 tangentially thereof. The stationary cutting member 9 is provided with a recess or groove 12 which is transversely aligned with a bore provided in the peripheral wall 3, and a pin 13 extends through this bore and into the recess 12 to secure the stationary cutting member 9 against rotation. As in the case of the rotary cutting member 5, the wall thickness of the teeth 10 of the stationary cutting member 9 is relatively great.

In accordance with the invention, both the rotary cutting member 5 and the stationary cutting member 9 are provided with removable separate cutter blade means in form of individual cutter blades. As is evident from FIGS. 3 and 3a, the teeth 7 of the rotary cutting member 5 are provided on their radially outwardly directed faces with grooves extending substantially or entirely over the height of the respective teeth. More specifically, these grooves are provided on such edges of the teeth 7 which during rotation of the rotary cutting member 5 will be the leading edges. Received in these grooves are the individual cutter blades 8 which are made from a material which is not only hard and therefore resistant to blunting and capable of retaining its sharpness, but which is also corrosion resistant.

Various different materials are suitable for this purpose. However, it has been found to be advantageous to use an alloy consisting predominantly of wolfram-carbide and cobalt. In particular it is often necessary in comminuting machines of the type herein described that the cutter assembly, and thus the cutter blades, be resistant to steam, salinity, alkalinity, and in some instances against acids in various degrees of concentration. Where this is required I prefer to use an alloy consisting of substantially 3% Co and substantially 97% WC-W$_2$C. Such an alloy has a density of approximately 15.6 g./cubic centimeter, a Vicker's hardness H$_v$30 of approximately 1500 kp./mm.$^2$. However, it should be understood that this example is by no means to be considered limiting.

The stationary cutting member 9 is similarly provided witth cutter blades. As is evident from FIGS. 4 and 4a, radially inner edges of the teeth 10 of the stationary cutting member 9 are provided with recesses in which there are received individual cutter blades 11, each of which is honed or ground to a cutting edge 16. This is of course also true of the cutter blades 8 on the rotary cutting member 5.

In accordance with the invention the cutter blades 8 and 11, respectively, are not soldered, welded or otherwise secured to the respective teeth, as one would normally expect. Rather, my deliberations have shown that it is sufficient to adhesively bond these cutter blades to their respective teeth. This is possible if the recesses in the respective teeth are so arranged and configurated that the pressure of material passing over the cutter blades will tend to press the same more firmly into engagement with the respective teeth by which the cutter blades are supported. Thus, the strength of an adhesive bond is entirely adequate for retaining the cutter blades in position since all such stresses which would be sufficiently strong to dislodge the cutter blades are transmitted thereby to the respective supporting teeth and cannot serve to lift the cutter blades away from these teeth.

It will be obvious that this arrangement has a number of important advantages over the prior art. Firstly, the cutter blades are readily detachable when they need to be sharpened. This is a simple procedure since, when the cutter members are disassembled, a force can be applied on the respective cutter blades in direction tending to move them not toward their respective supporting teeth as is the case when material passes over them, but away from these teeth. Forces acting in this direction will free the cutter blades easily. Secondly, the cutter blades can be individually resharpened and this is an operation which can be very easily carried out since the cutter blades are freely accessible from all sides thereof. Furthermore, the cutter blades can be replaced with new ones if they are worn too much through repeated sharpening. This is considerably less expensive than having to replace the entire cutting assembly or even only one of the cutting members thereof. Summing this up, therefore, it can be said that the manufacture of the individual cutting members is simplified and less expensive, that the cutter blades do not require as frequent sharpening as has heretofore been the case with cutting members on which the cutting edge was directly provided on the respective teeth integrally therewith, and that the cutter blades can be readily replaced with new ones if this becomes necessary, at little expense and without any great expenditure of labor.

The bonding of the cutter blades to their respective teeth by adhesive means represents an entirely novel and unexpected approach and contributes greatly to the ease of assembly and disassembly and to lowering of expenses, while providing a joint between the cutter blades and their respective associated teeth which is in every way as reliable as the conventional means employed for this purpose.

It will be understood that each of the elements described above, or two or more together, may also find a useful application in other types of comminuting devices differing from the types described above.

While the invention has been illustrated and described as embodied in a comminuting device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A comminuting device, including a receptacle having a transverse wall and a peripheral wall extending from one side of said transverse wall and provided with an outlet in the region of said transverse wall; a drive shaft extending through said transverse wall; cutter means arranged within said receptacle adjacent to said transverse wall and including a pair of cutter members having concentric annuli of teeth, at least the innermost one of said cutter members being secured to said drive shaft and adapted to be rotated therewith so that material entrained by said innermost cutter member has imparted thereto a rotary component of movement and passes between the teeth of said annuli in predetermined direction radially outwardly of said annuli and to said outlet in response to rotation of said drive shaft; and cutter blade means adhesively bonded to and supported against movement in said predetermined direction by the teeth of at least one annulus in such manner that pressure of the material against said teeth of said one annulus tends to press the respective cutter blade means into firmer engagement with the respective teeth.

2. A comminuting device as defined in claim 1, wherein said cutter blade means is provided on the teeth of the outermost member, and wherein said outermost member is stationary.

3. A comminuting device as defined in claim 1, wherein the respective cutter blade means extend slightly beyond the respective teeth in direction toward an adjoining tooth.

4. A comminuting device as defined in claim 1, wherein at least the cutter member comprisng said one annulus consists of corrosion-resistant material.

5. A comminuting device as defined in claim 1, wherein said cutter blade means consists of a material which is harder than the material of the cutter member which comprises said one annulus.

6. A comminuting device as defined in claim 1, wherein the respective cutter blade means extend slightly beyond the respective teeth in direction toward an adjoining tooth, and wherein the radially inner faces of the teeth of said one annulus together define a substantially cylindrical inner surface.

7. A comminuting device as defined in claim 1, wherein the respective cutter blade means extend slightly beyond their respective teeth in direction opposite to said rotary component of movement.

8. A comminuting device as defined in claim 5, wherein said cutter blade means consists of an alloy comprising predominantly wolfram-carbide and cobalt.

9. A comminuting device as defined in claim 1, wherein radially inner faces of the teeth of said one annulus are provided with respective recesses, said cutter blade means being received in said recesses in such manner as to extend slightly beyond the respective teeth in direction opposite to a rotary component of movement imparted to the material by rotation of said innermost cutter member.

References Cited

UNITED STATES PATENTS

| | | | |
|---|---|---|---|
| 1,939,768 | 12/1933 | De Bats. | |
| 3,193,206 | 7/1965 | Bidwell | 241—300 X |
| 3,230,991 | 1/1966 | Hermes | 146—192 |
| 2,938,558 | 5/1960 | Urschel | 146—192 X |

FOREIGN PATENTS

| | | |
|---|---|---|
| 428,727 | 5/1926 | Germany. |
| 1,148,734 | 5/1963 | Germany. |

OTHER REFERENCES

Moss: Araldite, in British Plastics, pp. 521–525, November 1948.

JAMES M. MEISTER, *Primary Examiner.*

U.S. Cl. X.R.

241—197, 248, 300